(12) United States Patent
Laursen et al.

(10) Patent No.: US 9,952,062 B2
(45) Date of Patent: Apr. 24, 2018

(54) CONSUMPTION METER WITH ANTENNA

(71) Applicant: Kamstrup A/S, Skanderborg (DK)

(72) Inventors: Peter Schmidt Laursen, Skanderborg (DK); Claus Jørgensen, Nørresundby (DK); Lasse Pilegaard, Horsens (DK)

(73) Assignee: KAMSTRUP A/S, Skanderborg (DK)

( * ) Notice: Subject to any disclaimer, the term of this patent is extended or adjusted under 35 U.S.C. 154(b) by 0 days.

(21) Appl. No.: 15/306,290

(22) PCT Filed: Apr. 27, 2015

(86) PCT No.: PCT/DK2015/050105
§ 371 (c)(1),
(2) Date: Oct. 24, 2016

(87) PCT Pub. No.: WO2015/165469
PCT Pub. Date: Nov. 5, 2015

(65) Prior Publication Data
US 2017/0052037 A1    Feb. 23, 2017

(30) Foreign Application Priority Data

Apr. 29, 2014    (EP) .................................... 14166371

(51) Int. Cl.
*G01D 4/00* (2006.01)
*H01Q 1/22* (2006.01)
*H04Q 9/00* (2006.01)

(52) U.S. Cl.
CPC ........... *G01D 4/002* (2013.01); *H01Q 1/2233* (2013.01); *H04Q 9/00* (2013.01); *H04Q 2209/40* (2013.01);
(Continued)

(58) Field of Classification Search
CPC .. G01D 4/002; H01Q 1/2233; H04Q 2209/40; H04Q 2209/60
See application file for complete search history.

(56) References Cited

U.S. PATENT DOCUMENTS 5,966,010 A    10/1999    Loy et al.
6,115,677 A    9/2000    Perthold et al.
(Continued)

FOREIGN PATENT DOCUMENTS

| EP | 2 579 007 A1 | 4/2013 |
|---|---|---|
| EP | 2579007 A1 | 10/2013 |

OTHER PUBLICATIONS

International Search Report and Written Opinion for corresponding International Patent Application No. PCT/DK2015/050105 dated Jul. 23, 2015.

*Primary Examiner* — Leon Flores
(74) *Attorney, Agent, or Firm* — Renner, Otto, Boisselle & Sklar, LLP.

(57) ABSTRACT

A consumption meter for measuring consumption data of a supplied utility is provided, the consumption meter comprising: a housing with an opening, where the housing forms a closed compartment when the opening of the housing is closed with a cover; a communication module provided in the closed compartment; a front plate provided in the closed department and arranged adjacent to the cover, wherein the front plate has a first front plate surface facing the cover, and a second front plate surface facing opposite; and an antenna comprising an antenna body with an antenna conductive element, which is connected to the communication module; wherein the front plate has an indentation arranged between the first and the second front plate surfaces, and wherein the antenna body is arranged in the indentation. The consumption meter provides an antenna with a high transmission performance. Further, the antenna is mechanically supported, and is arranged inside the closed compartment, eliminating the need of any feedthrough across the housing wall.

20 Claims, 8 Drawing Sheets

(52) U.S. Cl.
CPC ........ *H04Q 2209/60* (2013.01); *Y02B 90/241* (2013.01); *Y04S 20/32* (2013.01)

(56) References Cited

U.S. PATENT DOCUMENTS

| | | |
|---|---|---|
| 6,850,197 B2 | 2/2005 | Paun |
| 7,196,673 B2 | 3/2007 | Savage et al. |
| 7,671,814 B2 | 3/2010 | Savage et al. |
| 7,692,600 B1 | 4/2010 | Pakosz et al. |
| 7,994,994 B2 | 8/2011 | Savage et al. |
| 8,299,975 B2 | 10/2012 | Savage et al. |
| 8,310,403 B2 | 11/2012 | Nahar |
| 8,462,060 B2 | 6/2013 | Savage et al. |
| 8,931,337 B2 | 1/2015 | Renoud et al. |
| 2014/0306854 A1* | 10/2014 | Flores-Cuadras ...... H01Q 5/307 343/722 |

* cited by examiner (a)

(b)

CONSUMPTION METER WITH ANTENNA

This application is a national phase of International Application No. PCT/DK2015/050105 filed Apr. 27, 2015 and claims priority to European Application No. 14166371.6 filed Apr. 29, 2014 and published in the English language.

FIELD OF THE INVENTION

The present invention relates to a consumption meter for measuring consumption data of a supplied utility, such as water, heat, cooling or electricity. In particular, the invention relates to a consumption meter with an antenna.

BACKGROUND OF THE INVENTION

A consumption meter may be used for measuring utility usage in connection with charging of a consumed quantity of the utility, e.g. water, heating, cooling or electricity.

Wireless reading of consumption meters placed at the premises of a consumer offers a number of advantages: The need for on-site reading is eliminated, which otherwise may involve labour intensive and time consuming, and in turn costly processes. Further, wireless reading offers advantages in terms of the option of more frequent and close monitoring and control of utility consumption, as well as the elimination of human errors related to manual reading procedures.

With wireless reading power management in terms of management of the power consumption of the transmission system of the meter is essential, in particular with consumption meters with no external power supply, such as water, heating and cooling meters. Such meters are traditionally battery powered, and their lifetime is likely defined by the lifetime of the battery. Accordingly it is essential to keep their power consumption at a minimum.

On the other hand, transmission of data from the meter should preferably be made frequently and at high power to obtain a high signal/noise-ratio with the transmission. In particular with consumption meters mounted below-ground, e.g. in a pit, high demands are put on the transmission system performance and its power consumption. With such meters it is essential that the transmission system of the meter has a high efficiency in terms of transmission performance vs. power consumption.

Key elements of the transmission system of a consumption meter are the communication module and the antenna.

Traditionally communication modules are located in the body of the consumption meter, typically in terms of a printed circuit board, with the antenna being arranged on or adjacent to the printed circuit board. U.S. Pat. No. 6,850,197 B2 to M&FC Holding, LCC discloses such arrangement of an antenna on a printed circuit board.

Such arrangement of the antenna, however, is likely to be the subject of both of attenuation of the transmitted signal caused by the meter housing and of interference from other electronic components, and is far from optimal.

Alternatively, as disclosed with U.S. Pat. No. 8,310,403 B2 to General Electric Company, antennas may be arranged at the outside of the consumption meter to eliminate the above disadvantages, however, being instead subject to mechanical impact and insufficient sealing of the meter housing.

SUMMARY OF THE INVENTION

It would be advantageous to achieve a consumption meter with a hermetically sealed housing and with an antenna, which is capable of being operated with a high transmission performance, a low power consumption and which has a mechanically invulnerably location. In general, the invention preferably seeks to mitigate, alleviate or eliminate one or more of the above mentioned disadvantages of the prior art.

Accordingly, in a first aspect of the invention, there is provided a consumption meter for measuring consumption data of a supplied utility, the consumption meter comprising:
- a housing with an opening, where the housing forms a closed compartment when the opening of the housing is closed with a cover,
- a communication module provided in the closed compartment,
- a front plate provided in the closed compartment and arranged adjacent to the cover, wherein the front plate has a first front plate surface facing the cover, and a second front plate surface facing opposite, and
- an antenna comprising an antenna body with an antenna conductive element, which is connected to the communication module, characterized in that
- the front plate has an indentation arranged between the first and the second front plate surfaces, and
- the antenna body is arranged in the indentation.

A consumption meter with an antenna is thus provided which comprises a housing with a front plate which is arranged inside the housing and adjacent to the cover of the housing, i.e. near an external surface of the housing, and wherein the front plate has an indentation which is arranged between a first and a second surface thereof, and wherein the antenna body is arranged in the indentation.

Thus, according to the invention, the antenna is arranged near an external surface of the housing. With such location, the antenna is capable of being operated without the said disadvantages of attenuation from the meter housing and interference with other electronic components of the consumption meter, respectively.

Compared to antennas of the prior art, the consumption meter with the antenna according to the invention has an improved efficiency.

Further, being arranged with an indentation of the front plate, the antenna is mechanically supported and unlikely to be the subject of mechanical impact. Moreover, the antenna is arranged inside the closed compartment, eliminating the need of any feedthrough across the housing wall, which may otherwise compromise the sealing of the housing.

In the context of the present invention "a communication module" should be understood as the communication electronics of the transmission system of the consumption meter, typically arranged on a printed circuit board. In the context of the present invention it should be understood that the communication module does not include the antenna per se.

Further in the context of the present invention "an antenna body" should be understood as the entire antenna structure, comprising the basic antenna elements for transmission and/or reception, e.g. metal layers, wires or rods, which are referred to as "antenna conductive elements", as well as any auxiliary elements of the antenna like any cover or contacts.

Thus, in the context of the present invention "an antenna conductive element" should be understood as a basic antenna element, which is electrically connected to the communication module and which performs the actual transmission and/or reception of signals from and to the consumption meter.

By the term "the front plate has an indentation arranged between the first and the second front plate surfaces", is meant, in the context of the present invention, that the front plate has an indentation, indenting, i.e. recessing from one of the said front plate surfaces and in the direction of the other front plate surface, or in the volume between the first and the second front plate surfaces. Preferably the indentation is indenting into the volume between the first and the second front plate surfaces.

In the context of the present invention it should be understood that the front plate may be a monolithic body, i.e. made from a single piece of material only, e.g. from a polymer, and that the indention is formed with said body, e.g. simultaneously during a moulding of the body or subsequently in a cutting, drilling or milling process.

Alternatively the front plate may be made up of a plurality of front plate parts, such as two front plate parts, i.e. a first front plate part with the first front plate surface and a second front plate part with the second front plate surface, so that the front plate is formed upon assembly of the first and second front plate parts, e.g. by snap fitting the front plate parts together, so that the indentation is formed between them upon their assembly.

According to the invention the antenna body is arranged in the indentation. Thus, according to the invention, the antenna body is situated in the indentation, so that the entire antenna body, the majority thereof or at least some portion of the antenna body is recessed into the indentation. Preferably the antenna body is situated in the indentation, so that the entire antenna body, or the majority thereof is recessed into the indentation. Thus, in case the indentation is arranged on a surface of the front plate, the antenna body may be recessed into the indentation so that the upper surface of the antenna body is lowered relative to the said surface of the front plate, or the upper surface of the antenna may be aligned with the said surface of the front plate, or the surface of the antenna body may protrude from the surface of the front plate. Likewise, the indentation may be arranged at a connecting surface of the front plate, connecting the first and second front plate surfaces of the front plate, and the antenna body or the majority or part thereof may be arranged therein.

The recessed or indented arrangement of the antenna body in the front plate indentation offers an improved mechanical support of the antenna body compared to the prior art.

Thus with the prior art, U.S. Pat. No. 6,115,677 to Fraunhofer-Gesellshaft zur Föderung der angewandten Forschung e.V. discloses a consumption recording system affixed to a wall with a microstrip antenna, wherein the antenna is arranged adjacent to a casing cover of a consumption recording device, e.g. directly onto an antenna substrate with a metalized antenna area.

Although supported by an antenna area, such antenna may still be the subject of mechanical impact.

Further with the prior art, U.S. Pat. No. 7,196,673 B2 and family to Itron Electricity Metering, Inc. discloses a number of antenna configurations arranged with an antenna apparatus, an electronic device or a utility meter. With the '673 patent and family, however, the antenna is formed onto, e.g. patterned onto, a structural element of the apparatus, device or meter.

Thus, with one embodiment of the '673 patent, an antenna apparatus is formed on a layer surface of a printed circuit board, which circuit board provides an inner structural portion of the utility meter.

Also with the '673 patent, the printed circuit board of an electronic device forms a base structure for the electronic device, and the printed circuit board has on its layer surface a predefined portion of metallization which forms a functional antenna element.

Further with the '673 patent, a utility meter has a dielectric faceplate attached to the front of an internal housing component and an antenna being formed on a selected layer surface of the faceplate.

Turning to the other members of the patent family of the '673 patent, U.S. Pat. No. 7,671,814 B2 discloses an antenna apparatus for a utility meter, the antenna apparatus being formed on an inner surface of a body of dielectric material, which provides an integral structural portion of the utility meter.

Further, U.S. Pat. No. 7,671,814 B2 discloses a dielectric substrate forming a casing component for an electronic device, wherein the substrate has a predefined portion of metallization layered thereon, which forms a functional antenna element. U.S. Pat. No. 7,994,994 B2 discloses an electronic device with a similar antenna structure.

U.S. Pat. No. 8,299,975 B2 of the family of the '673 patent discloses a utility meter with a housing component for protecting selected electronics and other internal components of the utility meter, and a face plate attached to the front of said housing component, the faceplate having an inner and outer surface, and an antenna formed on one of these surfaces.

Eventually, with this family, U.S. Pat. No. 8,462,060 B2 discloses a similar antenna structure, which is configured to provide a generally uniform cardioidal radiation pattern.

Further with the prior art, U.S. Pat. No. 5,966,010 to ABB Power T&D Company Inc. discloses an antenna which is attached to the periphery of a circuit board by interaction between notches 20a of the board and holes 22a of the antenna. The body of the antenna, however, is not arranged in an indentation.

United State Patent U.S. Pat. No. 7,692,600 B1 to Mobile Marc, Inc. discloses a dipole antenna which is fastened to the top surface of a utility meter. Whereas a balun portion of the antenna is positioned with a notch defined by a sidewall of the meter, the body of the antenna is not arranged in an indentation.

Eventually, European Patent Application EP 2 579 007 A1 to Itron France discloses a helical antenna which is mounted with a water meter so that the end turn of the antenna is arranged in a groove of a metal insert. The body of the antenna, however, is not arranged in an indentation.

All of these pieces of prior art disclose antenna structures, which are arranged on substrate structures either by means of mechanical fastening means, adhesion, or being etched or inked onto the structural element of the apparatus, device or meter. There is with these pieces of prior art no disclosure of the mechanically protective environment as provided with the indentation of the front plate of the subject invention. At most, it is disclosed with the family of the '673 patent that an antenna in terms of a metallization pattern on a dielectric substrate may, once it is formed onto the substrate, be subject to application of another layer of dielectric material and thus be encapsulated and protected within such dielectric body. Still however, such encapsulation and protection is inferior as compared to the mechanical support and protection provided by means of the front plate and the indentation therein of the subject invention.

In a preferred embodiment of the invention the front plate comprises a connecting surface between the first and second front plate surfaces and connecting the first and second front plate surfaces, wherein the indentation is arranged at the connecting surface.

By way of non-limiting example, the front plate may be cylindrical, and the "connecting surface" is made up of the curved side of the cylinder, which in turn connects the first and second front plate surfaces, which make up the ends of the cylinder, i.e. the cylinder bases.

With this embodiment of the invention part of the connecting surface is recessed compared to the remaining part of this surface, thereby forming an indentation at the connecting surface of the front plate.

With this embodiment of the invention, the antenna body is recessed into the indentation at the connecting surface of the front plate so that the surfaces of the antenna body face the inner surfaces of the indentation, and that an outer surface of the antenna body may be lowered compared to, aligned with, or protrude from the connecting surface of the front plate.

Upon arranging the indentation at the connecting surface of the front plate and between the first and second surfaces of the front plate, the antenna body may be so arranged with the front plate as to be mechanically supported from both sides and to not occupy the front plate surface area, neither on the first front plate surface, nor on the second front plate surface.

According to this embodiment of the invention, such free front plate area allows for the option of labelling of the full area of the first front plate surface of consumption meter in its assembled state, i.e. when the cover of the consumption meter has been assembled with the opening of the housing. Thus the front plate may be labelled in-situ, e.g. by laser engraving across the cover. Production-wise in-situ labelling allows for a simplified process and logistics.

Also, keeping the full area of the second front plate surface free, allows for simplified handling of the front plate during assembly of the consumption meter, as well as for a precise assembling of the consumption meter.

In this respect the antennas as provided with the prior art occupy space on either of the front plate surfaces and thus do not allow the simplified manufacture involved with the subject invention.

In a preferred embodiment of the invention the first front plate surface defines a first front plate plane and the second front plate surface defines a second front plate plane, and the antenna body at the connecting surface extends in a plane parallel to at least one of the first or second front plate planes.

By way of example, the front plate according to this embodiment may be disc-shaped, i.e. cylinder-shaped with a significantly larger radius than height, and the antenna body being extending in an indentation along its curved side, thus in a plane parallel to the parallel surfaces of the disc.

Such positioning of the antenna body allows for accommodation of antennas, e.g. non-folded dipolar antennas, which dimension-wise are adapted for efficient operation in the frequency range 100-1000 MHz traditionally applied with utility meters, and which have higher transmission efficiency as have folded antennas.

With the consumption meter according to the invention, the antenna body is preferably self-supporting.

In the context of the present invention, with "self-supporting" should be understood that the antenna body is mechanically stable during manufacture and assembly so as to be physically handled, e.g. by an operator or by assembly machinery, and that the antenna body per se is a separate, un-supported component.

The self-supporting antenna body according to the invention allows for simplified handling during manufacture and assembly, involving a minimum of risk of mechanically damaging the antenna body. Also the self-supporting antenna body may be manufactured with high reproducibility.

According to the invention, the antenna conductive layer preferably comprises a metal core. Thus, according to the invention, the antenna body may be made up of the antenna conductive layer in terms of a metal core per se, i.e. the antenna body being a naked metal element, or it may include auxiliary elements like a solder stop mask.

Thus, according to another preferred embodiment of the consumption meter of the invention, the antenna body further comprises a solder stop mask.

By way of this embodiment, the antenna body constitutes a separate printed circuit board per se, including the antenna conductive layer and the solder stop mask covering at least part of the antenna conductive layer in order to protect such layer, mechanically and chemically.

In a particular embodiment of the invention, the antenna conductive layer has a first antenna conductive layer surface and a second antenna conductive layer surface, and both of the first and second antenna conductive layer surfaces are covered by the solder stop mask.

Such complete coverage of the antenna conductive layer surfaces by means of the solder stop mask allows for optimal protection of the antenna conductive layer, mechanically and against corrosion, and further provides mechanical stability to the antenna body.

According to a preferred embodiment of the invention, the antenna conductive element is connected to the communication module by means of a cable connection. Such cable connection means provides a flexible way of connecting the antenna and the communication module and allows for high degree of design freedom of the consumption meter.

According to an alternative preferred embodiment of the invention, the antenna conductive element is connected to the communication module by means of a contact of the pin header type. Such contact connection means, which is also referred to as a printed circuit board socket, provides a simple and convenient way of connection, with the further advantage of ease of manufacture, in particular in case the antenna body constitutes a printed circuit board.

According to the invention the antenna conductive element has an antenna body contact point at which contact point the cable connection or the pin header type contact is contacted or arranged. Preferably the contact point is arranged symmetrically with the antenna conductive element, dividing the antenna conductive element into two symmetrically arranged antenna conductive element parts, thereby establishing a dipolar antenna structure.

Thus, preferably the antenna is a dipolar antenna. Dipolar antennas are highly efficient.

Being arranged at the connecting surface of the front plate, the indentation of the front plate preferably has an indentation angular extension in an indentation angular range along the connecting surface of the front plate of between 30 and 360 degrees, preferably between 30 and 180 degrees, more preferably between 60 and 180 degrees, even more preferably between 120 and 180 degrees, or preferably between 270 and 360 degrees, more preferably between 300 and 360 degrees.

Thus, in a preferred embodiment of the invention the indentation extends along the connecting surface of the front plate and it preferably has an angular extension in the said ranges. The indentation may thus have a rather small extension of a few tens degrees along the connecting surface to accommodate a smaller antenna body, and the remaining part of the connecting surface may be used for other components of the consumption meter. Alternatively the indentation may extend along the majority of the front plate connecting surface, having an angular extension in the range of more than 200 or 300 degrees or even covering the full circumference of the front plate along its connecting surface to accommodate a larger antenna body in case such antenna body dimensions are required.

Of course, the antenna dimensions relate to the frequency applied. Thus, with an un-folded symmetrical half-wave dipolar antenna operating at a frequency in the range of 1000 MHz, the two quarter-wave antenna conductive elements parts each have an effective length in the range of 75 mm. Likewise, with an un-folded symmetrical half-wave dipolar antenna operating at a frequency in the range of 500 MHz, the two quarter-wave antenna conductive elements parts each have an effective length in the range of 150 mm.

Preferably the indentation has an angular extension in the range of 30-180 degrees, more preferably in the range of 60-180 degrees, and even more preferably in the range of 120-180 degrees to provide accommodation for efficient antenna bodies.

Alternatively, in another preferred embodiment of the invention, the indentation has an angular extension in the range of 270-360 degrees, more preferably in the range of 300-360 degrees, to provide accommodation for efficient antenna bodies of lower operational frequencies.

In a preferred embodiment of the invention the antenna body is annular.

Preferably the antenna body has an antenna body angular extension which corresponds to the indentation angular extension of the front plate. With such antenna body angular extensions the antenna body fits into the indentation for ease of production and maximum mechanical support. In particular, with antenna bodies not exceeding 180 degrees, the antenna body may be slidably arranged in the indentation of the front plate, allowing for ease of assembly of the consumption meter.

Such slidably arranged antenna bodies are preferably arranged with monolithic front plates.

Alternatively, with antenna bodies exceeding 180 degrees, such as antenna bodies with an angular extension up to 360 degrees, front plates made up of a plurality of front plate parts are preferably applied, which allow for an assembly process in which the antenna body is arranged and fixed between such front plate parts during the assembly.

According to an alternative embodiment of the invention, the antenna body has an antenna body angular extension which is smaller than the indentation angular extension by 10-60 degrees, more preferably smaller by 10-30 degrees. With such antenna body structures an indentation of a certain extension may accommodate a variety of antenna body structures, which may still fit into the indentation. According to this embodiment of the invention, front plates with a standardized indentation may be produced, which need not be adapted to the specific antenna body angular extension, and accordingly may save production cost.

Preferably the antenna conductive element has an antenna conductive element angular extension which corresponds to the antenna body angular extension.

According to another preferred embodiment of the invention, the antenna conductive element has an antenna conductive element angular extension which is smaller than the antenna body angular extension by 10-60 degrees, more preferably smaller by 10-30 degrees.

With this embodiment of the invention, an antenna body is provided, which has a larger angular extension than the antenna conductive element hosted therein. By way of example, the antenna body may have an angular extension of 180 degrees, hosting an antenna conductive element of an angular extension of 150 degrees, i.e. smaller by 30 degrees than the antenna body. Further with this example, arranging the contact point symmetrically with the antenna conductive element, two conductive elements parts each of an angular extension of 75 degrees are defined, each of which are angularly exceeded by 15 degrees of antenna body consisting of solder stop mask only with no conductive element hosted therein.

This embodiment of the invention allows for standardized antenna bodies. Thus, according to this embodiment of the invention, standardized antenna bodies, e.g. based on a standard printed circuit board may be produced, varying only the angular extension of the antenna conductive element hosted therein. Such antenna bodies are easy to produce, as they only require an adaptation of the length of the antenna conductive element, whereas they do not require a reconfiguration of the entire printed circuit board.

For ease of production, such embodiment of the invention allows for final configuration of the consumption meter in terms of transmission system rather late during the production cycle.

According to this embodiment the antenna body may be replaceably arranged in the indentation of the front plate and in turn with the consumption meter.

Thus, subject to a proper resealing of the consumption meter housing, a defect antenna of a consumption meter may be replaced without the need to replace the entire consumption meter or intact parts thereof, e.g. the communication module.

Also during reconfiguration of the transmission system with a consumption meter already installed at a consumer site, i.e. on-site reconfiguration, such antenna bodies are advantageous, as they allow ease of substitution of an antenna body of a new frequency for a previous antenna body of a previous frequency.

In a further preferred embodiment of the invention the indentation is arranged at the connecting surface of the front plate and has an indentation radial extension, i.e. an extension extending radially from the connecting surface towards the centre of the front plate, or, put differently, a "depth" of the indentation. Also the antenna body has an antenna radial extension, and the antenna body radial extension corresponds to the indentation radial extension. Preferably the radial extension of the indentation and/or of the antenna body make up the outermost 10-40%, more preferably the outermost 15-30% of a front plate radius.

With such embodiment of the invention the antenna body fits radially into the indentation, which allows for a proper accommodation of the antenna body in the indentation of the front plate.

Alternatively, the antenna body has an antenna radial extension which is smaller than the indentation radial extension. Thus, by way of example, the indentation may make up the outermost 20% of the front plate radius, whereas the antenna body makes up only the outermost 10% of the front plate radius.

In embodiments, the consumption meter may be or may be part of a charging consumption meter or utility meter, e.g. a water meter for cold and/or hot water, a gas meter, a heat meter, a cooling meter, an energy meter or a smart meter, where the consumption meter is arranged for measuring consumption data of a supplied utility used as a basis for billing. The consumption meter may be used in connection with district heating, district cooling and/or distributed water supply. The consumption meter may be a legal meter, i.e. a meter which is subdued to regulatory demands. Such regulatory demands may be demands to the precision of the measurements.

By way of measuring principle, the consumption meter may be based on ultrasonic flow measurement and include an ultrasonic flow meter part. The ultrasonic flow meter may be a transit time flow meter arranged to measure a flow rate of a fluid flowing in a flow channel by use of known operation principles for transit time flow meters, where ultrasonic signals are emitted at one transducer and received at the other transducer, and where the difference in time-of-arrival between oppositely propagating signals is measured and converted into a flow rate. Piezoelectric transducers are operated by a control circuit, which based on the involved signals generate a signal or value indicative of the flow rate of the fluid. The level of signal treatment of the control circuit may vary from basic signal treatment, where processed signals are output to a further electronic unit for further signal processing, to a complete signal treatment resulting in the determination of the flow rate.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
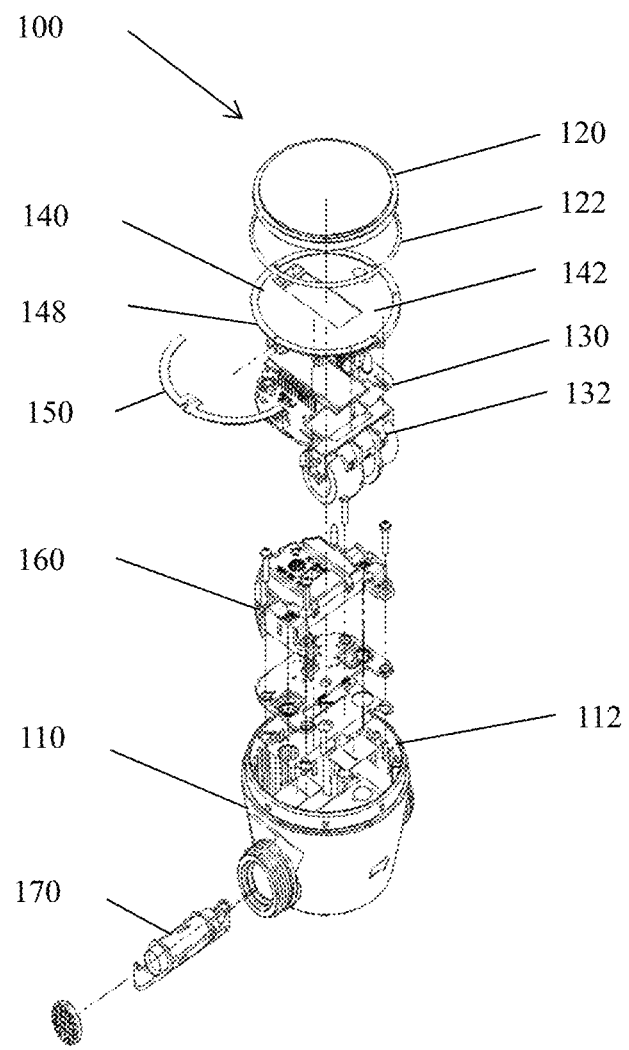
FIG. 1 shows an exploded view of the consumption meter of the present invention.

An embodiment of the invention is illustrated in FIG. 1, which shows an exploded view of the consumption meter 100 of the present invention. The consumption meter 100 has a housing 110 with an opening 112, to be closed with a cover 120 be means of the seal 122 to form a closed and hermetically sealed compartment. The housing 100 is made from polyphenylene sulphide (PPS), whereas the cover is made from polycarbonate (PC).

The communication module 130 is arranged in the closed compartment, and is powered by the battery 132.

The circular front plate 140, also arranged in the closed compartment, is a monolithic structure and has a first front plate surface 142 facing the cover 120, and receives the antenna body 150 at its connecting surface 148. The front plate 140 is circular with diameter of 80 mm and is made from acrylonitrile-butadiene-styrene copolymer (ABS).

Also shown with FIG. 1 are the ultrasonic mechanics and electronics 160 as well as the flow channel 170.

Figure 2:
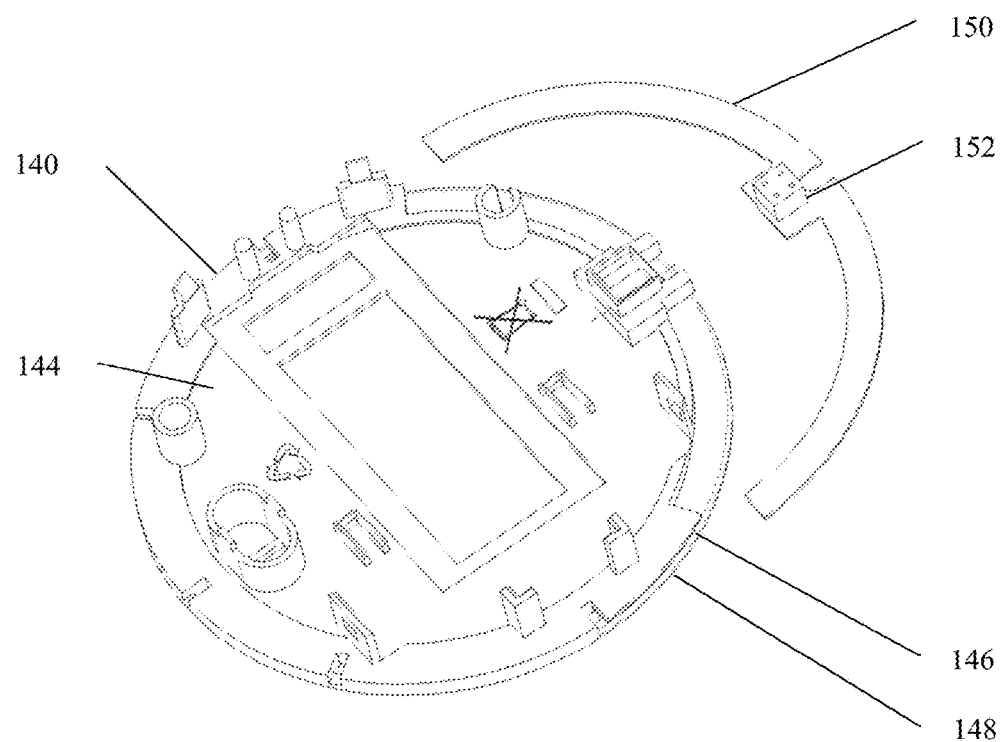
FIG. 2 shows an exploded view of the circular front plate, the antenna body, and the communication module of the consumption meter.

FIG. 2 shows the front plate 140 and the second front plate surface 144 thereof, the front plate having an indentation 146 arranged at the connecting surface 148 of the front plate 140 and between the first front plate surface 142 (not shown) and the second front plate surface 144, adapted for receiving the antenna body 150. The front plate 140 has a thickness of 1.50 mm. The indentation has an angular extension of 180 degrees and a thickness between the first front plate surface 142 and the second front plate surface of 0.5 mm.

The antenna body 150 in turn holds a contact 152 of the pin header type, arranged symmetrically with the antenna body. The antenna body has a outer diameter of 80 mm, a thickness of 0.5 mm and an angular extension of 180 degrees, fitting into the indentation.

Figure 3:
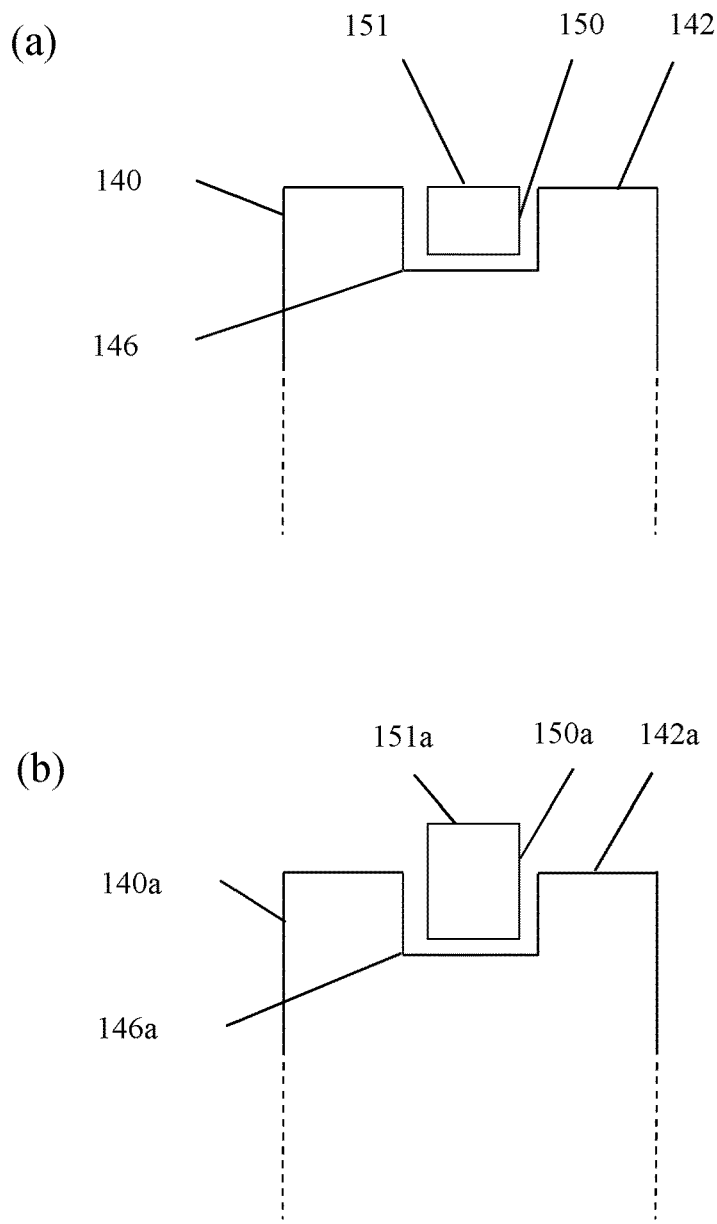
FIG. 3 shows schematics of antenna bodies being arranged in the indentation of the front plate.

FIG. 3 shows schematics of antenna bodies being arranged in the indentation of the front plate. Schematic (a) shows the indentation 146 of the front plate 140 holding an antenna body 150, wherein the antenna body 150 is so arranged in the indentation 146 that the outer surface 151 of the antenna body 150 is aligned with the first front plate surface 142. Schematic (b) shows an alternative embodiment, wherein the indentation 146a of the front plate 140a holds an antenna body 150a, wherein the antenna body 150a is so arranged in the indentation 146a that the outer surface 151a of the antenna body 150a protrudes from the first front plate surface 142a.

Figure 4:
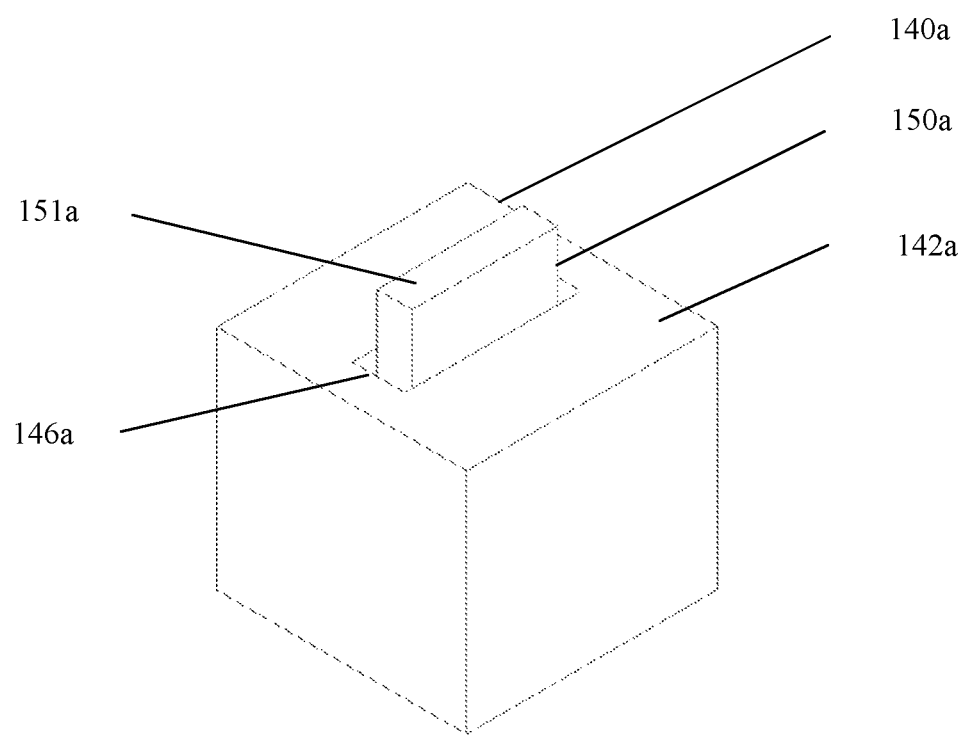
FIG. 4 shows a perspective schematic of an antenna body being arranged in an indentation of a planar front plate.

FIG. 4 shows a perspective schematic of the front plate 140a as shown in schematic (b) of FIG. 3, wherein the antenna body 150a is so arranged in the indentation 146a that the outer surface 151a of the antenna body 150a protrudes from the first front plate surface 142a.

Figure 5:
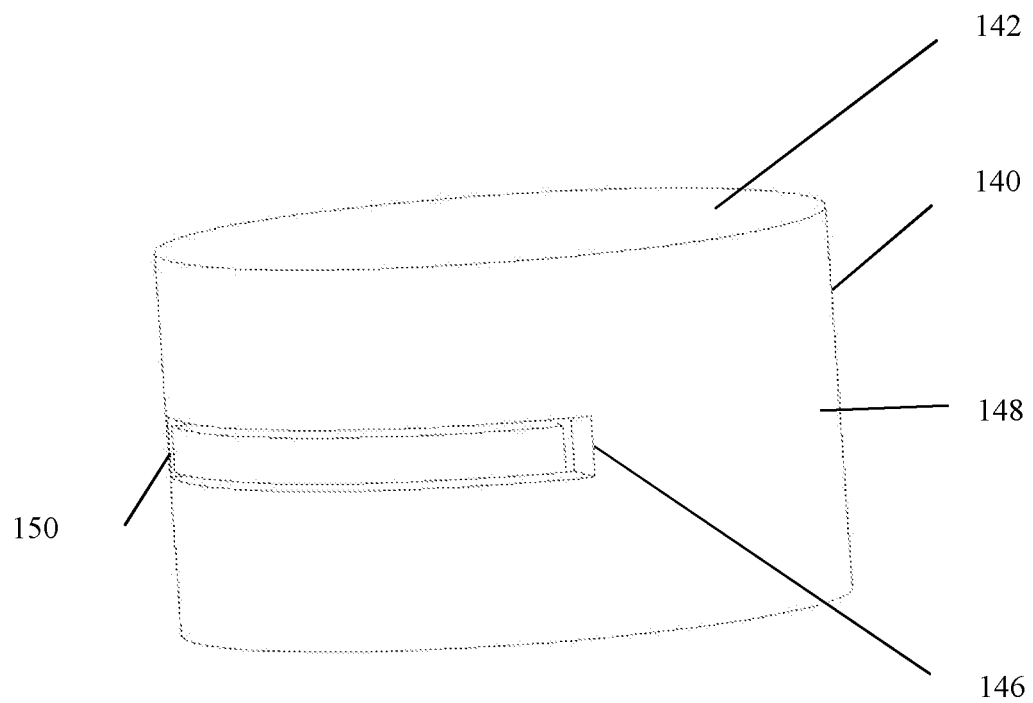
FIG. 5 shows a perspective schematic of the antenna body being arranged in the indentation arranged at the connecting surface of the circular front plate.

With FIG. 5 is shown a perspective schematic of the front plate 140 of FIG. 1, wherein the antenna body 150 is arranged in the indentation 146, arranged at the connecting surface 148 of the front plate 140 and aligned therewith, and further arranged between the first front plate surface 142 and the second front plate surface 144 (not shown).

Figure 6:
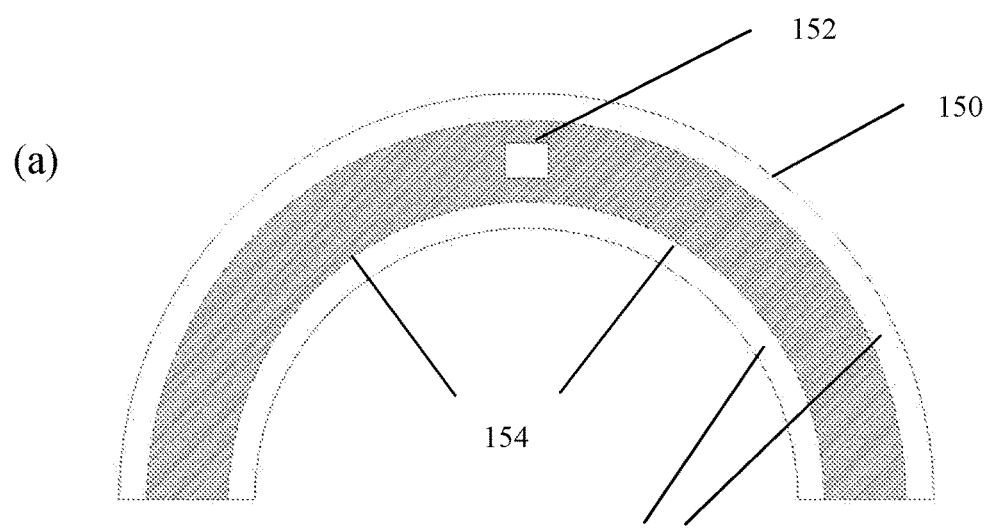
FIGS. 6a shows a schematic of the dipolar antenna with the antenna body with a symmetrical antenna conductive element, the element having an angular extension corresponding to the antenna body.
FIGS. 6b shows a schematic of a dipolar antenna with an antenna body with a symmetrical antenna conductive element, the element having an angular extension smaller than the antenna body.
Figure 6:
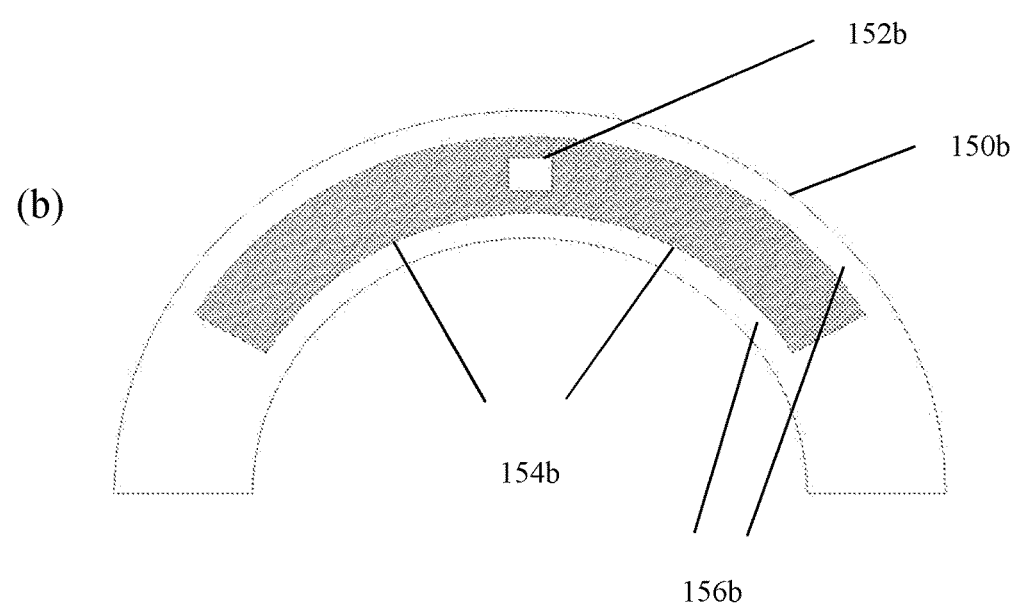

FIGS. 6a shows a schematic of the antenna of FIG. 1 with the antenna body 150 with a symmetrical antenna conductive element 154 made from copper, the contact 152, and a solder stop mask 156 made from an acrylate-based solder stop lacquer, the antenna conductive element 154 having an angular extension corresponding to the angular extension of the antenna body 150. The antenna with antenna body 150 constitutes a dipolar antenna, and with the antenna conductive element 154 having an angular extension of 180 degrees, the antenna is adapted for operation at 869 MHz.

FIGS. 6b shows a schematic of an alternative embodiment of the antenna, with the antenna body 150b with a symmetrical antenna conductive element 154b, a contact 152b, and a solder stop mask 156b, the antenna conductive element 154b having an angular extension smaller than the angular extension of the antenna body 150b.

Figure 7:
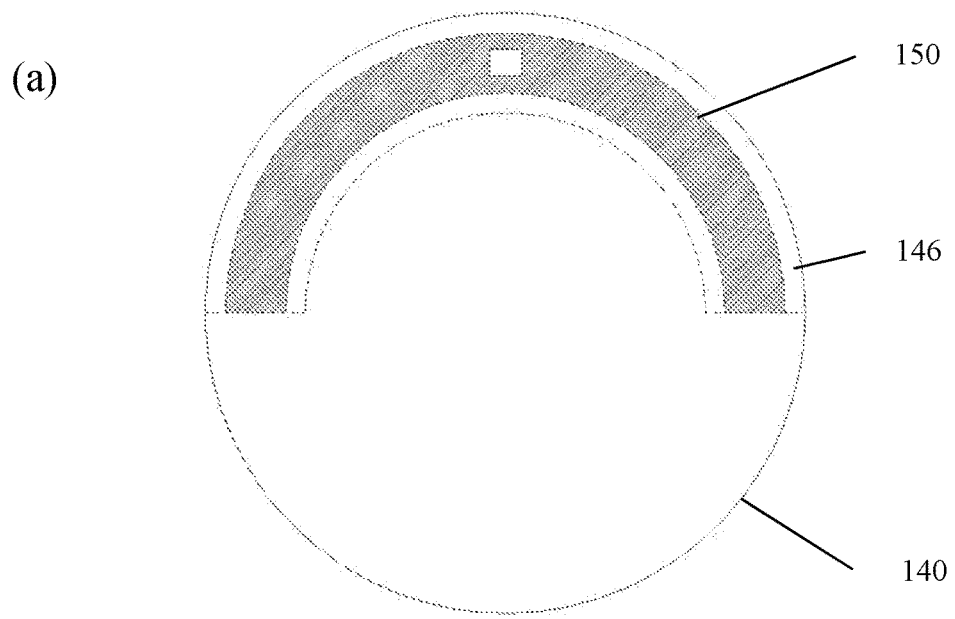
FIG. 7a shows a schematic of the front plate with the indentation and the antenna body of a corresponding angular extension.
FIG. 7b shows a schematic of a front plate with an indentation and an antenna body of an angular extension smaller than the indentation.
Figure 7:
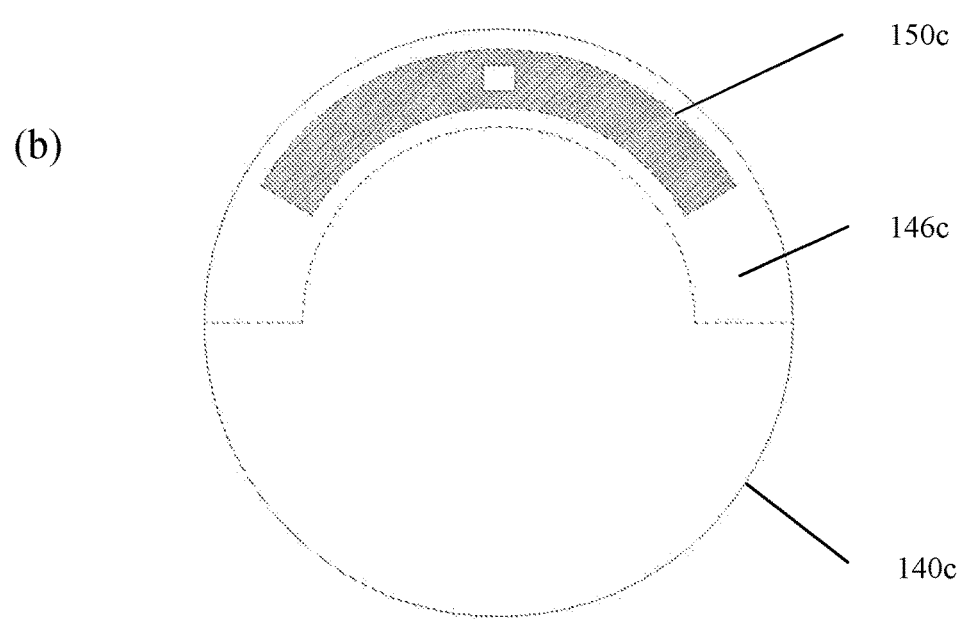

FIG. 7a shows a schematic of the front plate 140 of FIG. 1, wherein the antenna body 150 has an angular extension corresponding to the angular extension of the indentation 146.

FIG. 7b shows a schematic of an alternative embodiment of a front plate 140c, wherein the antenna body 150c has an angular extension which is smaller than the angular extension of the indentation 146c.

Figure 8:
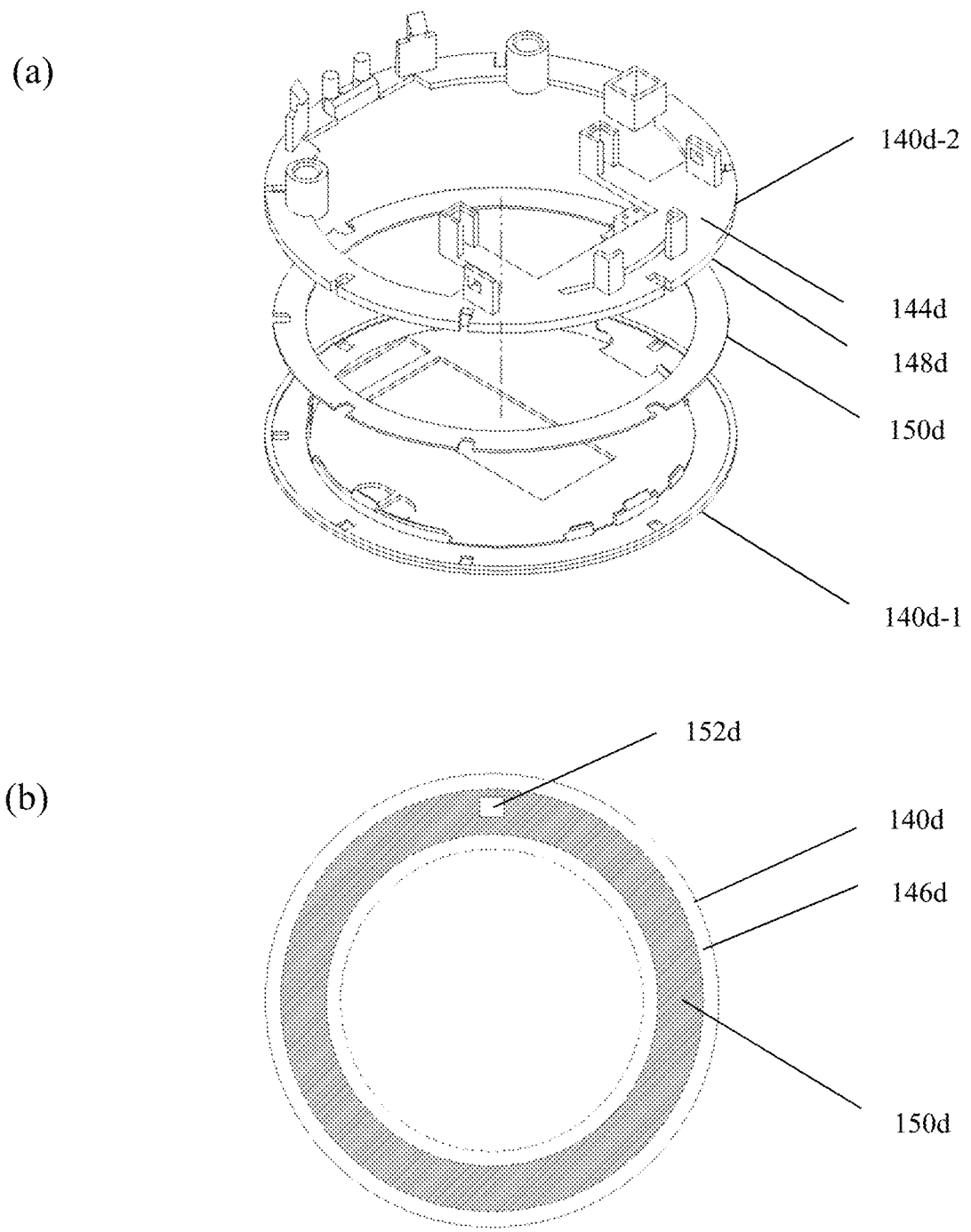
FIG. 8a shows an exploded view of an alternative embodiment of a front plate and an antenna body for a consumption meter according to the invention.
FIG. 8b shows a schematic of the alternative embodiment of a front plate and antenna body in their assembled state.

FIG. 8a shows an exploded view of an alternative embodiment of a front plate and an antenna body for a consumption meter according to the invention. The front plate (140d-1, 140d-2) is a two-part front plate consisting of a first front plate part 140d-1 with a first front plate surface (not shown) and a second front plate part 140d-2 with a second front plate surface 144d. Each of the front plate parts have a diameter of 80 mm and a thickness of 1 mm at its connecting surface 148d. Upon the assembly of the front plate parts by snap-fitting means (not shown) an indentation of a thickness of 0.5 mm between the front plate parts is formed at the interface between connecting surfaces 148d of the front plate parts, the thickness of the assembled front plate being 2.5 mm.

The antenna body 150d has a similar outer diameter of 80 mm and a thickness of 0.5 mm, thus fitting into the indentation for being fixed therewith. The antenna body 150d is an annular antenna body of a full angular extension of 360 degrees.

FIG. 8b shows a schematic of the front plate 140d (made up of front plate parts 140d-1 and 140d-2) with indentation 146d formed as described above.

The antenna body 150d holds a contact 152d of the pin header type. The antenna conductive element (no shown) of the antenna body 150d has an angular extension of 350 degrees, symmetrically arranged around the contact 152d, thus making up a dipolar antenna adapted for operation at 434 MHz.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A consumption meter for measuring consumption data of a supplied utility, the consumption meter comprising:
    a housing with an opening, where the housing forms a closed compartment when the opening of the housing is closed with a cover;
    a communication module provided in the closed compartment;
    a front plate provided in the closed compartment and arranged adjacent to the cover, wherein the front plate has a first front plate surface facing the cover, a second front plate surface facing opposite the first front plate surface, and a body between the first front plate surface and the second front plate surface; and
    an antenna comprising an antenna body with an antenna conductive element, which is connected to the communication module;
    wherein the front plate has an indentation extending from the first front plate surface and through the body toward the second front plate surfaces; and
    the antenna body is arranged in the indentation.

2. The consumption meter according to claim 1, wherein a connecting surface between the first and second front plate surfaces connects the first and second front plate surfaces, and wherein the indentation is arranged at the connection surface.

3. The consumption meter according to claim 2, wherein the first front plate surface defines a first front plate plane and the second front plate surface defines a second front plate plane, and wherein the antenna body extends in a plane parallel to at least one of the first or second front plate planes.

4. The consumption meter according to claim 1, wherein the antenna body is self-supporting.

5. The consumption meter according to claim 1, wherein the antenna conductive layer comprises a metal core.

6. The consumption meter according to claim 1, wherein the antenna body comprises a solder stop mask.

7. The consumption meter according to claim 6, wherein the antenna conductive layer has a first antenna conductive layer surface and a second antenna conductive layer surface, and wherein both of the first and second antenna conductive layer surfaces are covered by the solder stop mask.

8. The consumption meter according to claim 1, wherein the antenna conductive element is connected to the communication module by means of a cable connection.

9. The consumption meter according to claim 1, wherein the antenna conductive element is connected to the communication module by means of a contact of the pin header type.

10. The consumption meter according to claim 1, wherein the antenna is a dipolar antenna.

11. The consumption meter according to claim 1, wherein the indentation of the front plate has an indentation angular extension in an indentation angular range along the connecting surface of between 30 and 360 degrees, preferably between 30 and 180 degrees, more preferably between 60 and 180 degrees, even more preferably between 120 and 180 degrees, or preferably between 270 and 360 degrees, more preferably between 300 and 360 degrees.

12. The consumption meter according to claim 11, wherein the antenna body has an antenna body angular extension which corresponds to the indentation angular extension.

13. The consumption meter according to claim 11, wherein the antenna body has an antenna body angular extension, which is smaller than the indentation angular extension by 10-60 degrees, more preferably smaller by 10-30 degrees.

14. The consumption meter according to claim 12, wherein the antenna conductive element has an antenna conductive element angular extension, which is smaller than the antenna body angular extension by 10-60 degrees, more preferably smaller by 10-30 degrees.

15. The consumption meter according to claim 1, wherein the indentation has an indentation radial extension, and the antenna body has an antenna radial extension, and wherein the antenna body radial extension corresponds to the indentation radial extension.

16. The consumption meter according to claim 1, wherein the first front plate surface and the second front plate surface are parallel.

17. A consumption meter for measuring consumption data of a supplied utility, the consumption meter comprising:
    a housing with an opening, where the housing forms a closed compartment when the opening of the housing is closed with a cover;
    a communication module provided in the closed compartment;

a front plate provided in the closed compartment and arranged adjacent to the cover, wherein the front plate has a first front plate surface facing the cover, and a second front plate surface facing opposite; and an antenna comprising an antenna body with an antenna conductive element, which is connected to the communication module;

characterized in that the front plate has an indentation arranged between the first and the second front plate surfaces; and the antenna body is arranged in the indentation, wherein the indentation of the front plate has an indentation angular extension in an indentation angular range along the connecting surface of between 30 and 360 degrees, preferably between 30 and 180 degrees, more preferably between 60 and 180 degrees, even more preferably between 120 and 180 degrees, or preferably between 270 and 360 degrees, more preferably between 300 and 360 degrees.

18. The consumption meter according to claim 17, wherein the antenna body has an antenna body angular extension which corresponds to the indentation angular extension.

19. The consumption meter according to claim 17, wherein the antenna body has an antenna body angular extension, which is smaller than the indentation angular extension by 10-60 degrees, more preferably smaller by 10-30 degrees.

20. The consumption meter according to claim 19, wherein the antenna conductive element has an antenna conductive element angular extension, which is smaller than the antenna body angular extension by 10-60 degrees, more preferably smaller by 10-30 degrees.

* * * * *